INVENTOR
J. C. SCHELLENG
BY R. B. Anderson
ATTORNEY

INVENTOR
J. C. SCHELLENG
BY R. B. Ardis
ATTORNEY

INVENTOR
J. C. SCHELLENG
BY R. B. Ardis
ATTORNEY

United States Patent Office 3,019,296

Patented Jan. 30, 1962

3,019,296

PHASE STABILIZATION OF CIRCUITS WHICH EMPLOY A HETERODYNE METHOD

John C. Schelleng, Asbury Park, N.J., assignor to Bell Telephone Laboratories, Incorporated, New York, N.Y., a corporation of New York Filed Aug. 11, 1958, Ser. No. 754,392
7 Claims. (Cl. 179—15.5)

This invention relates to phase-compensation networks and more particularly to phase-compensation networks for reducing the requirements of oscillator frequency stability in a system which employs a single oscillator for a plurality of interdependent frequency conversions.

The term "interdependent frequency conversions" is used here to mean frequency conversions in which the converters, or modulators employed are interconnected so that, for example, the output of one converter is an input of another and one of the inputs of each converter is supplied with a frequency component from a common oscillator.

The invention is particularly useful in a self-timed regenerative pulse repeater for pulse transmission systems. A regenerative pulse repeater is a repeater which includes a regenerator circuit for producing and sending out new pulses of standardized phase, duration and amplitude under the control of received pulses. Such a repeater is "self-timed" when the timing wave for timing the regenerator is derived from the signal pulse train, as it is supplied to the repeater. The timing wave has a frequency equal to the pulse repetition rate of the received signal pulse train. Thus, in a self-timed regenerative pulse repeater, timing information may be derived from the received signals and used for the timing of the regenerator circuit.

It is desirable to make the band width of the circuit used for deriving this timing information as narrow as possible in order to reduce noise the other extraneous signal components present in the received signals. In a conventional timing circuit (a reduction of bandwidth is ordinarily achieved by using a very high-Q filter. The disadvantage in using such a filter is that when it becomes slightly detuned (which may result, for example, from mere temperature variation), a substantial change of phase of the timing wave out of the filter may result. The circuit may therefore become unstable with respect to phase. If, however, the filter used is of the heterodyne type (hereinafter referred to simply as "heterodyne filter"), which will be described in detail below, a reduction in timing circuit bandwidth with substantially no reduction in phase stability may be achieved.

Since an independently running oscillator is relied on in a heterodyne filter, the frequency drift that is likely to occur in the oscillator becomes a limiting factor in the design and operation of the regenerative pulse repeater. This is especially true of a pulse transmission system where several repeaters are to be used in tandem, since deviations in the phase of the timing wave, caused by variations in local oscillator frequency, become cumulative from repeater to repeater and may become excessive in the finally received message.

Accordingly, it is a primary object of this invention to reduce the requirements of oscillator frequency stability in heterodyne circuits, i.e., in circuits that employ an oscillator to perform a plurality of interdependent frequency conversions.

It is a related object to simplify and to make more economical the means for reducing the frequency stability requirements of an oscillator so employed.

It is another object of this invention to render the phase angle of the output signal of a heterodyne circuit independent of the frequency of its local oscillator.

It is a more particular object of this invention to reduce phase distortion in the timing circuitry of self-timed regenerative pulse repeaters.

In accordance with the invention, the phase of the output signal of a heterodyne filter, comprising input and output frequency converters interconnected by an intermediate frequency circuit and connected in heterodyne relationship with a local oscillator, is made independent of frequency deviations of the oscillator. This is accomplished by interconnecting the oscillator and the output converter with a phase-compensation network having a phase-shift versus frequency deviation characteristic which is substantially identical to that of the intermediate frequency circuit over a predetermined range of frequencies corresponding to probable deviations in the frequency of the oscillator.

In a heterodyne filter using a phase-compensation circuit, so-connected and having such a frequency characteristic, the undesirable effects of oscillator frequency deviation are overcome. The oscillator may vary from its prescribed center frequency, yet the phase of the output of the heterodyne filter is independent of these variations. The invention may thus be advantageously used in circuits whose phase stability is of paramount importance: most notably, in regenerative pulse repeaters.

The invention will be understood more fully from the following more detailed description, read in conjunction with the accompanying drawing, in which:

FIG. 3(*b*) is a plot which shows, over a limited range of frequencies, the phase-shift versus oscillator frequency deviation characteristic of the intermediate frequency circuit shown in FIG. 1, where the signal frequency ($f_1$) is less than the oscillator frequency ($f_2$);

Figure 1:
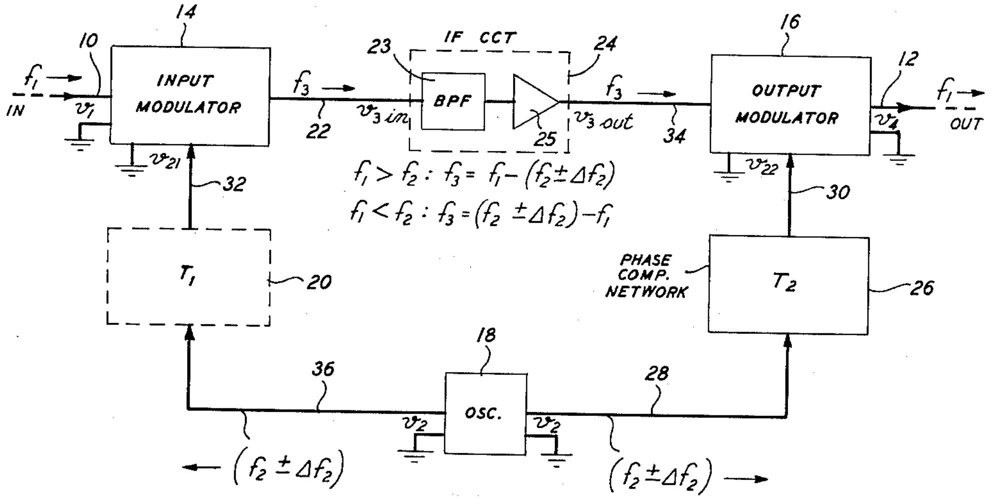
FIG. 1 is a block diagram of a heterodyne circuit arranged in accordance with the invention.
Figure 3A:
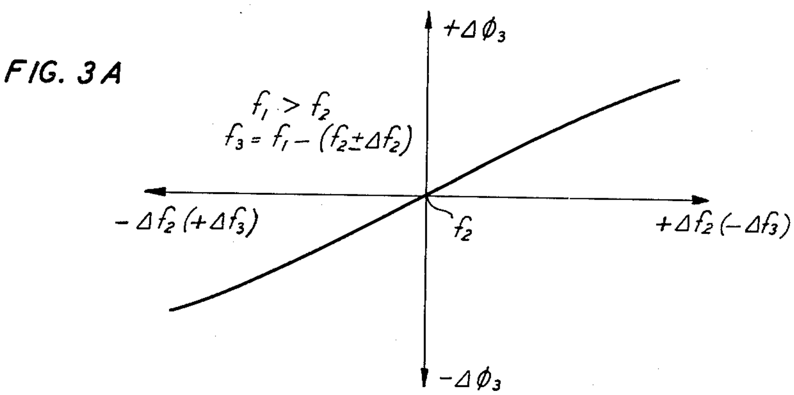
FIG. 3(*a*) is a plot which shows, over a limited range of frequencies, the phase-shift versus oscillator frequency deviation characteristic of the intermediate frequency circuit shown in FIG. 1, where the signal frequency ($f_1$) is greater than the oscillator frequency ($f_2$)
Figure 3B:
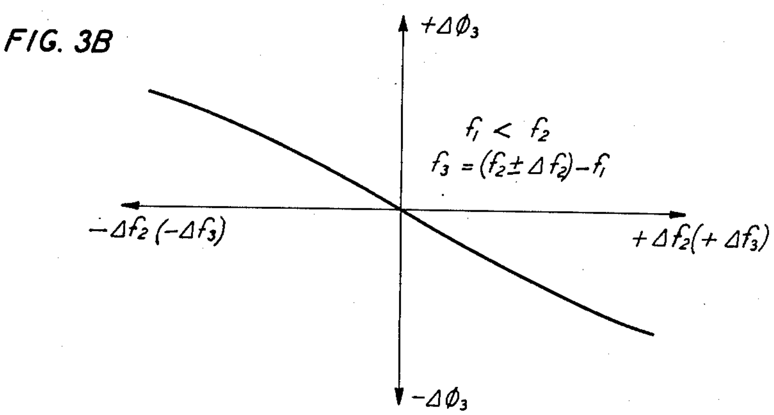
Figure 5:
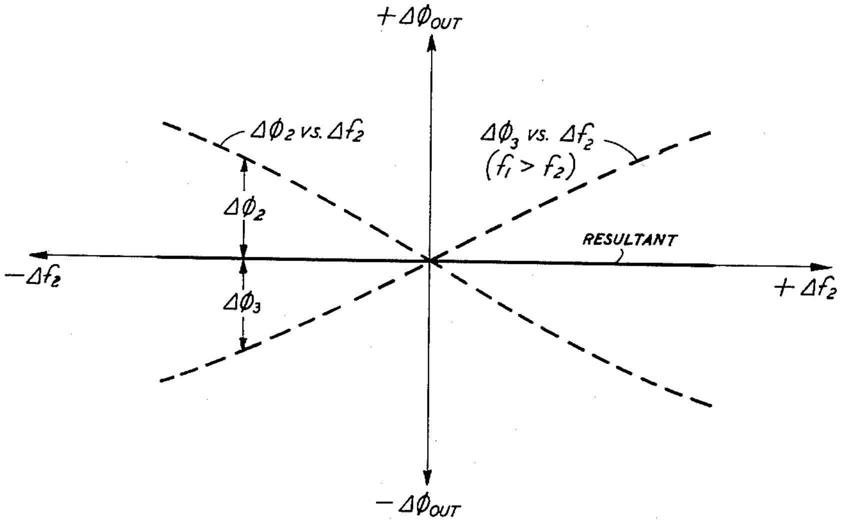
Figure 6:
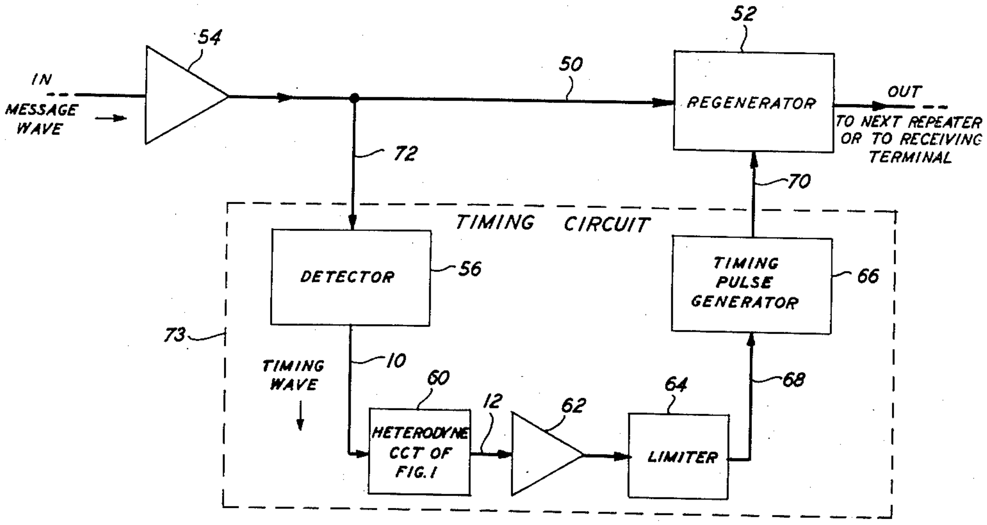

FIG. 5 is a composite plot of FIGS. 3(*a*) and 4 which illustrates how the phase of the output signal of the heterodyne circuit of FIG. 1 is made independent of deviations in the frequency of the oscillator in the case where the signal frequency ($f_1$) is greater than the oscillator frequency ($f_2$); and FIG. 6 is a block diagram of a self-timed regenerative pulse repeater arranged in accordance with the invention.

The circuit of FIG. 1 can be used as a filter with a very narrow bandwidth for the purpose of reducing noise and other interference which accompanies the desired signal at input 10. This narrowness of bandwidth results from the transference of selectivity to a circuit of low frequency, viz., the intermediate frequency circuit 24. Since the intermediate frequency $f_3$ may be made one or several orders of magnitude lower than the input fundamental frequency $f_1$ without markedly changing the quality factor Q of the heterodyne circuit, the bandwidth thereof can be correspondingly reduced. In this way the band as seen at input 10 is reduced to a width which, without heterodyning, could be obtained only with a circuit of unrealistically high Q.

In FIG. 1 a reduction in operating frequency is achieved by combining the input frequency $f_1$ with the oscillator frequency $f_2$ in the input modulator 14 to produce an intermediate (i.e., difference) frequency $f_3$. It should be noted that the frequency $f_1$ of the signal $v_1$ supplied to the input 10 will be assumed constant to facilitate the discussion which follows. $f_1$ can be greater or less than $f_2$, as indicated in FIG. 1. The ensuing discussion is mainly concerned with the case where $f_1$ is greater than $f_2$. The case where $f_1$ is less than $f_2$ will be discussed, however, whenever it is felt that this will lead to a better understanding of the invention.

The input modulator 14, the output modulator 16, and the oscillator 18 are interconnected in heterodyne relationship. Oscillator 18 ideally supplies a signal $v_2$ having a center frequency $f_2$, but deviations from this frequency (which are bound to occur) will result in an oscillator output frequency which will hereinafter be denoted either as $(f_3 \pm \Delta f_2)$ or simply as $f_2'$. In the sense used throughout this description, a "deviation" means a change from an otherwise constant value.

The fictitious network 20, indicated by a dotted line, has been shown in order to aid in the discussion of the relationship between the phase of the signal $v_4$ appearing at the output 12 of the heterodyne circuit and any deviation $\pm\Delta f_2$ from the center frequency $f_2$ of the oscillator 18. This relationship will be more fully discussed below. Network 20 is intended to represent any phase-shifting (i.e., time-delaying) characteristics of the connections between oscillator 18 and input modulator 14.

Figure 2:
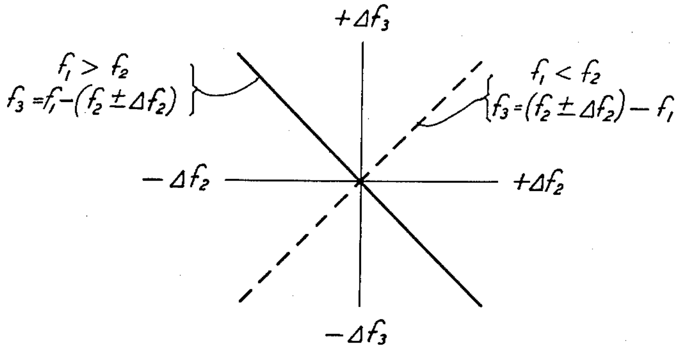
FIG. 2 is a plot which shows the manner in which the intermediate frequency of the heterodyne circuit of FIG. 1 varies with variations of oscillator frequency.

The intermediate frequency $f_3$ is supplied to the input 22 of the frequency-selective, intermediate frequency circuit 24; and is equal to $f_1$ minus $f_2'$ for the case where the signal frequency $f_1$ is greater than the oscillator frequency $f_2$, and to $f_2'$ minus $f_1$ for the case where the signal frequency $f_1$ is less than the oscillator frequency $f_2$. The variation of the intermediate frequency $f_3$ with variations of the oscillator center frequency $f_2$ is illustrated in FIG. 2. As indicated, $f_3$ is given by the solid line for the case where $f_1$ is greater than $f_2$ and is given by the dotted line for the case where $f_1$ is less than $f_2$. The two cases involve different frequency characteristics for the phase-compensation (or delay) network 26. This difference is illustrated in FIGS. 3(*a*) and 3(*b*).

The intermediate frequency circuit 24, which is shown in FIG. 1 as consisting of a band-pass filter 23 and an amplifier 25, is tuned to the frequency $f_3$. Circuit 24 would ordinarily be, for example, a band-pass amplifier; and it should be understood, therefore, that the separation of the band-pass and the amplifying properties of such an amplifier, as illustrated by the band-pass filter 23 and the amplifier 25, is intended merely to facilitate discussion of the invention.

It is well known that the phase shift (i.e., time delay) in a frequency-selective circuit, such as the intermediate frequency circuit 24, is ordinarily dependent upon the frequency of the signal supplied to its input. Thus, when the frequency of the oscillator 18 deviates by an increment $\pm\Delta f_2$, there is a corresponding phase shift, or time delay in circuit 24. Unless means are provided to compensate for this phase shift, it will affect the phase of the signal $v_4$ supplied to the output 12 of the heterodyne circuit, thus rendering the phase of this signal dependent upon the frequency stability of oscillator 18. This is a most undesirable consequence, especially when the signal which has been filtered is to be used for timing purposes as, for example, in a self-timed regenerative pulse repeater.

Figure 4:
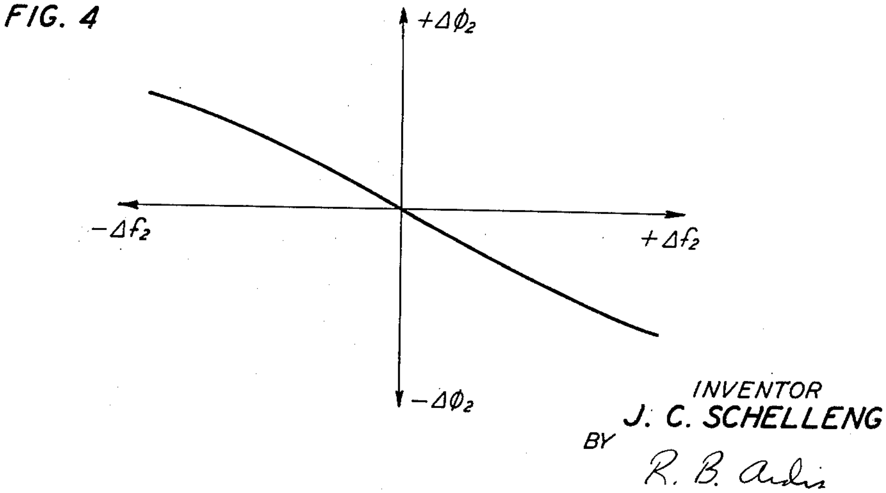
FIG. 4 is a plot, over a limited frequency range, which shows the phase-shift versus oscillator frequency deviation characteristic of the phase-compensation, or delay network shown in FIG. 1.

The phase-shift versus oscillator frequency deviation characteristic of the intermediate frequency circuit 24 is shown in FIGS. 3(*a*) and 3(*b*). FIG. 3(*a*), as previously mentioned, illustrates a typical frequency characteristic for the case where $f_1$ is greater than $f_2$, while FIG. 3(*b*) represents the case where $f_1$ is less than $f_2$. In accordance with the invention, a phase-compensation network 26 is inserted in the connections between the output 28 of the oscillator and the input 30 of the output modulator and is designed so that its phase-shift versus frequency deviation characteristic, which is illustrated in FIG. 4, is substantially identical to that of circuit 24.

In order to avoid any possible confusion, it should be explained at this point that FIG. 3(*a*) has not been plotted as it ordinarily would be. Ordinarily $\Delta\Phi_3$ would have been plotted as a function of $\Delta f_3$ and not of $\Delta f_2$.

The phase characteristics spoken of above as identical are, as a result of this deviation from normal plotting methods, apparently the inverse of one another in the case where $f_1$ is greater than $f_2$. Yet it will be understood in the discussion to follow that the increments of phase $\Delta\Phi_3$ and $\Delta\Phi_2$ are, in fact, of opposite polarity in the case where $f_1$ is greater than $f_2$; and, further, that in this case the output modulator 16 of FIG. 1 is a "sum" modulator in that it must take the sum of the frequencies $f_3$ and $f_2$ to derive the signal frequency $f_1$. The phase increments $\Delta\Phi_3$ and $\Delta\Phi_2$ are therefore added in the output modulator 16. This liberty in plotting $\Delta\Phi_3$ as a function of $\Delta f_2$ has been taken to set the stage for FIG. 5, which is a composite plot of FIGS. 3(*a*) and 4 and is helpful in that it graphically illustrates the manner in which circuit 26 compensates for phase changes in the phase $\Phi_{out}$ of the output signal $v_4$. It will be noted, however, that FIG. 5 is a helpful graphical illustration only in the case where $f_1$ is greater than $f_2$, for which case the output modulator 16 is a "sum" modulator in which the phase increments $\Delta\Phi_2$ and $\Delta\Phi_3$ are added.

For the case where $f_1$ is less than $f_2$ the output modulator is a "difference" modulator since it must take the difference of the frequencies $f_3$ and $f_2$ to derive the signal frequency $f_1$. (It will be noted here that $f_2$ minus $f_3$ equals $f_1$.) The phase increments $\Delta\Phi_2$ and $\Delta\Phi_3$ are therefore subtracted in the case where $f_1$ is less than $f_2$, so that if one were to subtract the curve of FIG. 3(*b*) from the curve of FIG. 4 the same resultant would be obtained as is obtained in FIG. 5. The invention will, it is believed, become more clear in the mathematical analysis which follows.

At present, however, it should be noted that phase-compensation circuits are well known in the art. The design of such networks is taught, for example, in United States Patents No. 1,735,052 and No. 1,770,422 which issued to H. Nyquist on November 12, 1929, and July 15, 1930, respectively. Thus, given a network having a particular phase-shift versus frequency deviation characteristic, one may readily design a network having a characteristic substantially identical to that of the given network.

It is well known that the phase angle of the output signal of a modulator is a function of the phase angles of the signals supplied to its inputs. Thus, it will be noted that the phase angle of the signal $v_4$ is a function of the phase angles of signals $v_{3out}$ and $v_{22}$. That the phase angle of the signal $v_4$ will, in the practice of the invention, be independent of the variations in the phase angles of the signals $v_{3out}$ and $v_{22}$, which variations are caused by the frequency instability of oscillator 18, is shown graphically in FIG. 5. The plot of FIG. 5 is, as previously alluded, derived by superimposing the plot of FIG. 3(*a*) on that of FIG. 4. The dotted line labeled $\Delta\Phi_3$ versus $\Delta f_2$ is derived from FIG. 3(*a*) and illustrates the dependency of the phase shift in the intermediate frequency circuit 24 on the frequency stability of oscillator 18. This dependency is eliminated, in accordance with the invention, by the phase-compensation network 26, whose phase-shift versus frequency deviation characteristic is substantially identical to—though here plotted as the inverse of—that of circuit 24 and is shown as the dotted line labeled $\Delta\Phi_2$ versus $\Delta f_2$ in FIG. 5.

It will be helpful at this point to show, mathematically, the manner in which the phase angle of the output signal $v_4$ shown in FIG. 1 is, absent the practice of the invention, dependent upon the frequency stability of the oscillator 18 and how, in accordance with the invention, the phase-compensation network 26 eliminates this dependency. It will be noted that the following mathematical analysis is far from complete in that all terms have been ignored which are not of interest in the explanation of the relationship between the phase angle of the output signal $v_4$ and deviations in the frequency of the oscillator 18. Equations 1 through 7 are directed to the case where $f_1$ is greater than $f_2$. The case where $f_1$ is less than $f_2$ will subsequently be developed.

The voltage $v_1$ supplied to the input 10 of input modulator 14 may be expressed as $$v_1=A \cos 2\pi f_1 t \quad (1)$$

The voltage $v_2$ appearing at the outputs 28 and 36 of oscillator 18 may be expressed as $$v_2=B \cos (2\pi f_2' t+\Phi) \quad (2)$$

where $f_2'=(f_2\pm\Delta f_2)$ and $\Phi$ is a phase constant.

If it is assumed that a phase shift of $2\pi f_2' T_1$ radians occurs in the connections between the oscillator 18 and the input modulator 14 (the fictitious delay network 20 is intended to show a possible time delay of $T_1$ seconds), then the voltage $v_{21}$ appearing at the input 32 of input modulator 14 may be expressed as $$v_{21}=B \cos (2\pi f_2' t-2\pi f_2' T_1+\Phi) \quad (3)$$

In accordance with the invention, and for reasons which will be understood more clearly as the discussion proceeds, the phase-compensation network 26 is serially inserted in the connections between the output 28 of oscillator 18 and the input 30 of output modulator 16 to shift the phase of the oscillator output signal $v_2$ by $2\pi f_2' T_2$ radians. This phase shift is accomplished by delaying the signal $v_2$ for $T_2$ seconds. Accordingly, the voltage $v_{22}$ supplied to the input 30 may be expressed as $$v_{22}=B \cos (2\pi f_2' t-2\pi f_2' T_2+\Phi) \quad (4)$$

The voltage $v_{3in}$ supplied to the input 22 of the intermediate frequency circuit 24 is taken to have an amplitude $k_1$ proportional to the product of the amplitudes A and B of the voltages $v_1$ and $v_{21}$ and, since modulator 14 is a "difference" modulator, a phase angle equal to the difference between the phase angles of these voltages. The voltage $v_{3in}$ may thus be expressed as $$v_{3in}=k_1 \cos [2\pi(f_1-f_2')t+2\pi f_2' T_1-\Phi] \quad (5)$$

Because the intermediate frequency circuit 24 has a time delay (assumed to be $T_3$ seconds), variations in $f_3$ caused by variations in the oscillator frequency $f_2'$ will cause the phase shift (i.e., time delay) through circuit 24 to vary. When variations in the oscillator frequency $f_2'$ are considered, therefore, the voltage $v_{3out}$ at the output of the circuit 24 may be written as (assuming, for present purposes, no change in the amplitude of the input voltage $v_{3in}$).

$$v_{3out}=k_1 \cos [2\pi(f_1-f_2')t-2\pi(f_1-f_2')T_3+2\pi f_2' T_1-\Phi] \quad (6)$$

where $T_3$ represents the time delay occurring within circuit 24.

It can be seen that the phase angle of $v_{3out}$ varies with the oscillator frequency $f_2'$. The incremental variation $\pm\Delta\Phi_3$ of the phase angle of $v_{3out}$ as a function of deviations from the center frequency of oscillator 18 is shown in FIG. 3(*a*). It is this variation in the phase angle of the voltage $v_{3out}$ which, absent the teachings of the present invention, renders the phase angle of the output voltage $v_4$ dependent on the frequency stability of the oscillator 18.

The voltage $v_4$ is taken to have an amplitude $k_2$ proportional to the product of the amplitudes $k_1$ and B of the voltages $v_{3out}$ and $v_{22}$. The phase angle of $v_4$ is, since modulator 16 is a "sum" modulator in the case where $f_1$ is greater than $f_2$, equal to the sum of the phase angles of the voltages $v_{3out}$ and $v_{22}$ (see FIG. 5). Thus, the voltage $v_4$ may be expressed as $$v_4=k_2 \cos [2\pi(f_1-f_2')t-2\pi(f_1-f_2')T_3+2\pi f_2' T_1-\Phi+2\pi f_2' t-2\pi f_2' T_2+\Phi] \quad (7)$$

$$v_4=k_2 \cos 2\pi[f_1(t-T_3)+f_2'(T_1+T_3-T_2)] \quad (8)$$

In accordance with the invention, the time parameter $T_2$ is made equal to the sum of the parameters $T_1$ and $T_3$ over a predetermined range of the oscillator frequency $f_2'$, which equality results in the following expression for the output voltage $v_4$ $$v_4=k_2 \cos 2\pi f_1(t-T_3) \quad (9)$$

It can be seen, therefore, that in the practice of the invention, the output voltage $v_4$ of the illustrative heterodyne circuit of FIG. 1 is made independent of the oscillator frequency $f_2'$. The advantage of using such a circuit in the timing circuit of a regenerative repeater will be readily apparent and will be discussed in connection with FIG. 6.

The case where $f_1$ is less than $f_2$ will now be considered. Equations 1 through 4 apply equally well here.

The difference frequency $f_3$, however, is now equal to $f_2'$ less $f_1$. As a result, Equation 5 becomes $$v_{3in}=k_1 \cos [2\pi(f_2'-f_1)t-2\pi f_2' T_1+\Phi] \quad (10)$$

and Equation 6 becomes $$v_{3out}=k_1 \cos [2\pi(f_2'-f_1)t-2\pi(f_2'-f_1)T_3-2\pi f_2' T_1+\Phi] \quad (11)$$

Since, as previously discussed, output modulator 16 must be a "difference" modulator in the case where $f_1$ is less than $f_2$, the phase angle of $v_4$ is in this case equal to the difference between the phase angles of the voltage $v_{3out}$ (Equation 11) and $v_{22}$ (Equation 4). Equations 8 and 9 therefore remain unchanged and are applicable as well to the case where $f_1$ is less $f_2$.

Reference is now made to FIG. 6 which illustrates a self-timed regenerative pulse repeater, arranged in accordance with the invention. Probably one of the most acute problems encountered in the timing of regenerative pulse repeaters is the problem of eliminating noise and other disturbances from the timing wave without affecting its phase relationship with the pulse-modulated message wave, since it is the function of the timing wave to restore each pulse of the message wave in its proper time position. As previously mentioned, in the sense used here a "self-timed" repeater is one which derives timing information from the message wave itself, i.e., from the incoming train of signal pulses. The invention, however, is equally applicable to "externally-timed" systems in which the timing information is transmitted over a separate channel.

In FIG. 6, an incoming, pulse-modulated message wave is supplied to input 50 of regenerator 52 via amplifier 54. In a self-timed repeater, means must be provided for deriving timing information from the message wave. The first step in so deriving the timing information is performed by detector 56, which detects the envelope of the pulse-modulated message wave. The detected pulse train is next passed through a filter circuit 60 (note that circuit 60, with its input 10 and its output 12, is intended to be the heterodyne circuit shown in FIG. 1), wherein is generated a timing wave having a frequency equal to the pulse repetition rate of the message wave. The timing wave is then amplified by amplifier 62, limited by the limiter 64, and supplied to a timing pulse generator 66. In response to the timing wave supplied to the input 68 of the pulse generator 66, a train of pulses, the time positions of which are determined by the phase of the timing wave, is supplied to the input 70 of the pulse regenerator 52.

The message wave supplied to the input 50 of the regenerator 52 will be accurately regenerated only if the timing pulses generated by the pulse generator 66 are in proper time relationship with the pulses of the message wave. These timing pulses will probably not be in proper time relationship if, in addition to the extraneous components superimposed on the timing wave supplied to the input 72 of the timing circuit 73, phase changes occur in the filter circuit 60.

The extraneous components supplied to the timing circuit 73 are ordinarily spread out over a large portion of the frequency spectrum. It is apparent, therefore, that the narrower the pass-band of filter circuit 60 (or, in other words, the higher the effective Q of the filter), the fewer the number of undesired components which will be passed on to amplifier 62 and, for reasons well known, the smaller the phase deviation of the timing wave supplied to the pulse generator 66.

In the conventional high-Q filter, however, reduction of bandwidth is limited; for, as the bandwidth of the filter is made more narrow (i.e., as the Q of the filter is increased), the filter becomes more susceptible to detuning (brought about, for example, by temperature variation) and, consequently, to phase instability. Detuning of this sort is commonly encountered, for example, in frequency modulation tuners.

This susceptibility to detuning is overcome in the heterodyne circuit of FIG. 1, which is shown in FIG. 6 as the filter circuit 60. The heterodyne circuit may have a very high effective Q, yet, as previously mentioned, its phase stability is rendered substantially independent of the frequency stability of the oscillator 18. In this discussion, the "effective" Q of the heterodyne circuit is intended to mean the Q determined by considering the entire heterodyne circuit (i.e., all of FIG. 1) and the input and output (timing signal) frequency $f_1$; whereas the "actual" Q of the heterodyne circuit is intended to mean the Q determined by considering only the intermediate frequency circuit 24 and the much lower intermediate frequency $f_3$.

For the same Q, the bandwidth of a circuit is less at a lower frequency than it is at a higher one. By the same reasoning, one circuit must have a greater Q than another, if they both have the same bandwidth but the one has a higher operating frequency than the other. It will be understood, therefore, that the heterodyne circuit of FIG. 1 has a relatively high effective Q in that an equivalent circuit would have to have the relatively narrow bandwidth of the intermediate frequency circuit 24 and yet operate at the much higher timing wave frequency $f_1$. The relatively narrow bandwidth of the intermediate frequency circuit 24 is thus used to advantage in the heterodyne circuit of FIG. 1, which, in turn, is advantageously employed as the timing filter circuit 60 of FIG. 6.

By using the phase-stabilized heterodyne circuit of FIG. 1, therefore, the quality and reliability of performance of a regenerative pulse repeater timing circuit may be greatly improved. Interfering noise present in the timing signal is drastically reduced in strength because of the very high effective Q and consequent narrow bandwidth of the circuit; yet, in accordance with the invention, the phase angle $\Phi_{out}$ (see FIG. 5) of the output signal $v_4$ is rendered independent of the frequency stability of the local oscillator. Experiments have shown that the bandwidth of a heterodyne timing filter circuit like that of FIG. 1 can be 100 times less than that of a circuit having the same Q as the intermediate frequency circuit 24 and operating at the timing frequency $f_1$, without decreasing the phase stability of the heterodyne circuit.

Although the present invention has been discussed only in connection with specific embodiments, they should be considered as merely illustrative, for the invention also encompasses such other embodiments as come within its spirit and scope.

What is claimed is:

1. In combination, a first source of signals, signal utilization means, and a heterodyne circuit interconnecting said source and said utilization means; said circuit comprising first and second modulators and a local oscillator; means interconnecting said modulators and including an intermediate frequency circuit; means for connecting said local oscillator to said first modulator and to said second modulator; said means interconnecting said second modulator and said local oscillator including a circuit having a phase-shift versus frequency deviation characteristic which is substantially identical to the same characteristic of said intermediate frequency circuit over a predetermined range of frequencies.

2. In combination, a source of signal of desired frequency $f_1$, a heterodyne circuit for filtering out extraneous components of said signal, and means for supplying said signal of frequency $f_1$ to the input of said heterodyne circuit; said heterodyne circuit comprising means for supplying a frequency $f_2$; an input modulator having an output and a pair of inputs for producing at said output the difference frequency $f_3$ of said frequencies $f_1$ and $f_2$; an output modulator having an output and a pair of inputs for combining said difference frequency $f_3$ and said frequency $f_2$ to produce at its output the frequency $f_1$; means interconnecting said modulators, said source of frequency $f_1$, and said source of frequency $f_2$ in heterodyne relationship; said last-named means including an intermediate frequency circuit interconnecting said modulators, and a phase-compensation network interconnecting said source of frequency $f_2$ and said output modulator; said phase-compensation network having a phase characteristic substantially identical to that of said intermediate frequency circuit over a predetermined range of frequencies in order to reduce the requirements of frequency stability of said source of frequency $f_2$, whereby said frequency $f_2$ may drift within a substantial range of frequencies without affecting the phase stability of said heterodyne circuit.

3. The combination in accordance with claim 2 wherein $f_1$ is greater than $f_2$ and $f_3$ consequently equals $f_1$ minus $f_2$, and wherein said output modulator is a sum modulator producing at its output the sum of said frequencies $f_3$ and $f_2$, i.e., said desired fundamental frequency $f_1$.

4. The combination in accordance with claim 2 wherein $f_1$ is less than $f_2$ and $f_3$ consequently equals $f_2$ minus $f_1$, and wherein said output modulator is a difference modulator producing at its output the difference between said frequencies $f_3$ and $f_2$, i.e., said desired fundamental frequency $f_1$.

5. In combination, a source of signal of desired fundamental frequency $f_1$, a heterodyne circuit for filtering out extraneous components superimposed on said signal and means for supplying said signal of frequency $f_1$ to the input of said heterodyne circuit; said heterodyne circuit comprising means for supplying a frequency $f_2$; an input modulator having an output and a pair of inputs for producing at said output the difference frequency $f_3$ of said frequencies $f_1$ and $f_2$; an output modulator having an output and a pair of inputs for combining said difference frequency $f_3$ and said frequency $f_2$ to produce at its output the desired frequency $f_1$; means for connecting the input of said heterodyne circuit to one of said pair of inputs of said input modulator and means for connecting the output of said output modulator to the output of said heterodyne circuit; means interconnecting said modulator; said source of frequency $f_1$ and said source of frequency $f_2$ in heterodyne relationship; said last-named means including means for interconnecting said output of said input modulator and one of said inputs of said output modulator and including a circuit tuned to said difference frequency $f_3$; said means interconnecting said modulators and said source of frequency $f_2$ including a phase-compensation network having a phase-shift versus frequency deviation characteristic which is substantially identical over a predetermined range of frequencies to that of said circuit tuned to the frequency $f_3$, whereby said frequency $f_2$ may vary within a substantial range of frequencies without affecting the phase stability of said heterodyne circuit.

6. The combination in accordance with claim 5 wherein said circuit tuned to the frequency $f_3$ comprises a tuned amplifier circuit.

7. In combination: a source of signal of fundamental frequency $f_1$; a heterodyne circuit, including a local oscillator, employing interdependent frequency conversions to eliminate undesired components superimposed on said signal and whose phase stability is otherwise dependent upon the frequency stability of said local oscillator, said oscillator deviating from its prescribed frequency $f_2$ by an increment of frequency $\pm\Delta f_2$; and means to supply said signal to said heterodyne circuit, said heterodyne circuit comprising: an input modulator having an output and a pair of inputs for producing at said output the difference frequency $f_3$ of said frequencies $f_1$ and $f_2$; an output modulator having an output and a pair of inputs for combining said difference frequency $f_3$ and said frequency $f_2$ to produce at its output said fundamental frequency $f_1$; means interconnecting said modulators, said source of frequency $f_1$, and said oscillator in heterodyne relationship; said means interconnecting said modulators including a circuit tuned to the difference frequency $f_3$, an incremental phase shift of $\pm\Delta\Phi$ radians occurring in said tuned circuit in response to said incremental oscillator frequency deviation $\pm\Delta f_2$, respectively where $f_1$ is greater than $f_2$, and inversely where $f_1$ is less than $f_2$; said means interconnecting said oscillator and said output modulator including a phase-compensation network for shifting the phase of signals supplied from said oscillator to said output modulator by substantially $\pm\Delta\Phi$ radians inversely in response to said incremental frequency deviation $\pm\Delta f_2$.

References Cited in the file of this patent

UNITED STATES PATENTS

| | | |
|---|---|---|
| 1,428,156 | Espenschied | Sept. 5, 1922 |
| 1,550,660 | Affel | Aug. 25, 1925 |
| 1,958,954 | Plebanski | May 15, 1934 |
| 1,964,522 | Lewis | June 26, 1934 |
| 2,457,136 | Earp | Dec. 28, 1948 |
| 2,463,503 | Atkins | Mar. 8, 1949 |
| 2,933,691 | Stair | Apr. 19, 1960 |

FOREIGN PATENTS

| | | |
|---|---|---|
| 527,042 | Canada | June 26, 1956 |
| 578,512 | Great Britain | July 2, 1946 |